United States Patent [19]

Rawlings et al.

[11] Patent Number: 4,569,203

[45] Date of Patent: Feb. 11, 1986

[54] CRYOGENIC COOLER

[75] Inventors: Richard M. Rawlings, Richardson; Henry L. Hoefelmeyer, Wylie, both of Tex.

[73] Assignee: Texas Instruments Incorporated, Dallas, Tex.

[21] Appl. No.: 665,467

[22] Filed: Oct. 29, 1984

[51] Int. Cl.⁴ .............................................. F25B 9/00
[52] U.S. Cl. ........................................ 62/6; 60/520; 62/296; 92/85 A
[58] Field of Search ................. 62/6, 296; 60/520; 92/85 R, 85 A; 250/352

[56] References Cited

U.S. PATENT DOCUMENTS

| | | | |
|---|---|---|---|
| 1,715,406 | 6/1929 | Christenson | 92/85 R |
| 3,364,675 | 1/1968 | Dorer | 62/6 |
| 3,413,802 | 12/1968 | Cowans | 62/6 |
| 3,685,501 | 8/1972 | Honda | 92/85 R |
| 3,849,652 | 11/1974 | Dix et al. | 250/352 |
| 4,242,946 | 1/1981 | Toliusis | 92/85 R |
| 4,409,793 | 10/1983 | Durenec | 62/6 |

Primary Examiner—Ronald C. Capossela
Attorney, Agent, or Firm—Alva H. Bandy; Leo N. Heiting; Melvin Sharp

[57] ABSTRACT

A thermal energy detecting system includes a closed cycle cooler (refrigerator) having a piston assembly including a piston, a piston housing and a preloaded spring mounted in the piston housing between the head of the piston and the piston housing for substantially reducing any bearing clearances of the piston assembly during the pressure changes occurring above and below the piston during the cooling cycle of the cooler.

4 Claims, 4 Drawing Figures

CRYOGENIC COOLER

This invention relates to cryogenic coolers and more particularly to a closed cycle cryogenic cooler having substantially reduced operating noise.

In the past the use of a thermal sight has dictated whether a closed cycle cooler (refrigerator) or an open cycle cooler (cryostat) would be used to cool the infrared detector or detector array. If the use was subject to noise detection a cryostat was required owing to the offending noise of prior art closed cycle coolers.

The use of open cycle coolers presents serious logistical disadvantages. The cryogen needed for the open cycle cooler is contained in gas bottles; supplying the gas bottles to the thermal sight users is the crux of the logistics problem. In addition, the use of gas bottles reduces the continuous use time of the thermal sights substantially. Also the hazards of using high pressure gas bottles in the field are axiomatic.

The closed cycle cooler requires only a source of electricity to operate. Existing electrical sources provide for almost continuous lifetime operation thereby reducing substantially the logistics problem. Nevertheless, the noise detection problem has limited the universal use of the closed cycle cooler in thermal sights.

It was found that the noise generated by the closed cycle cooler was amplified by the coupling of the cooler to the thermal sight; decoupling reduced the noise, but by isolating the cooler from the thermal sight the major heatsink for the cooler was eleminated and the cooler housing temperature rose to an unacceptable level. Further the mounting method required that the Dewar also be isolated from the system; this resulted in the inability to retain boresight and proved to be insufficient during vibration tests.

Accordingly, it is an object of this invention to provide a thermal energy detector having an acceptable noise level for use where noise detection is a problem.

Another object of this invention is to provide a closed cycle cooler having a substantially reduced noise factor for use in a thermal sight.

Another object of the invention is to provide a closed cycle cooler having an acceptable noise level when coupled to the thermal sight housing for boresight capability retention.

Briefly stated, the thermal sight includes a closed cycle cooler having a spring loaded piston to reduce operational noise to acceptable limits. The major cause of the noise in the cooler is the clearance in the needle bearings of the piston assembly, and the noise is produced in pulses. The timing of the pulses with operation of the cooler's compressor reveals that the compressor generates a sinusoidal pressure output. A characteristic of this pressure wave is that at some portion of the cycle the pressure in the working volume of the cooler is greater than the pressure in the crankcase volume. At other portions of the cycle, the working volume pressure is less than the crankcase pressure.

A comparison of the noise pulses with respect to the pressure wave reveals that the noise pulses are generated at the point in the cycle where the working volume pressure becomes greater than the crankcase pressure and again at the point that the working volume pressure drops below the crankcase volume pressure. At these points the forces acting on the piston assembly become zero. The cooler is quiet when the clearances in the piston assembly bearings are zero; this is because at the zero force points in the cycle the piston assembly stops its motion. However, the eccentric shaft does not stop its motion because it is being driven by the cooler motor. While there is a small amount of clearance in the bearings, the eccentric shaft leaves the surface of the bearing and when the clearance is taken up, it impacts the opposite surface of the bearing. This impact generates the noise pulse.

Other objects and features of the invention will become more readily apparent from the following detailed description when read in conjunction with the accompanying drawings in which.

Figure 1:
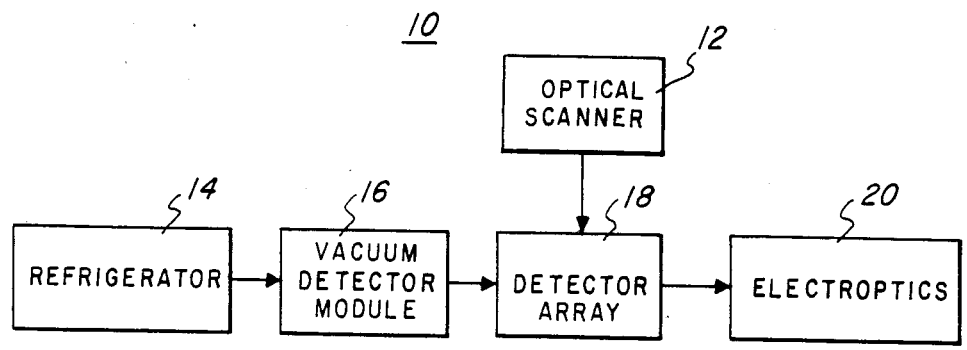
FIG. 1 is a block diagram of a forward looking infrared energy (FLIR) system.

Referring now to FIG. 1. the forward looking infrared system 10 includes an optical scanner 12, refrigerator 14, vacuum/detector module 16, detector array 18 and electro-optics 20. Refrigerator 14 has a cold finger 22 (FIG. 2) for insertion into a correspondingly shaped vacuum Dewar (not shown) of vacuum detector module 16 (FIG. 1). The vacuum Dewar of the vacuum detector module supports the detector array 18 adjacent the cold end of the cold finger 22 for cooling to its operating temperature. The detector array is positioned at one end of the optical path to the optical scanner 12. The optical scanner 12 scans the infrared energy emanating from a scene (not shown). The detector array 18 generates electrical signals representative of the energy emanating from the scene and the electro optics 20 produces a visible representation thereof for display.

Figure 2:
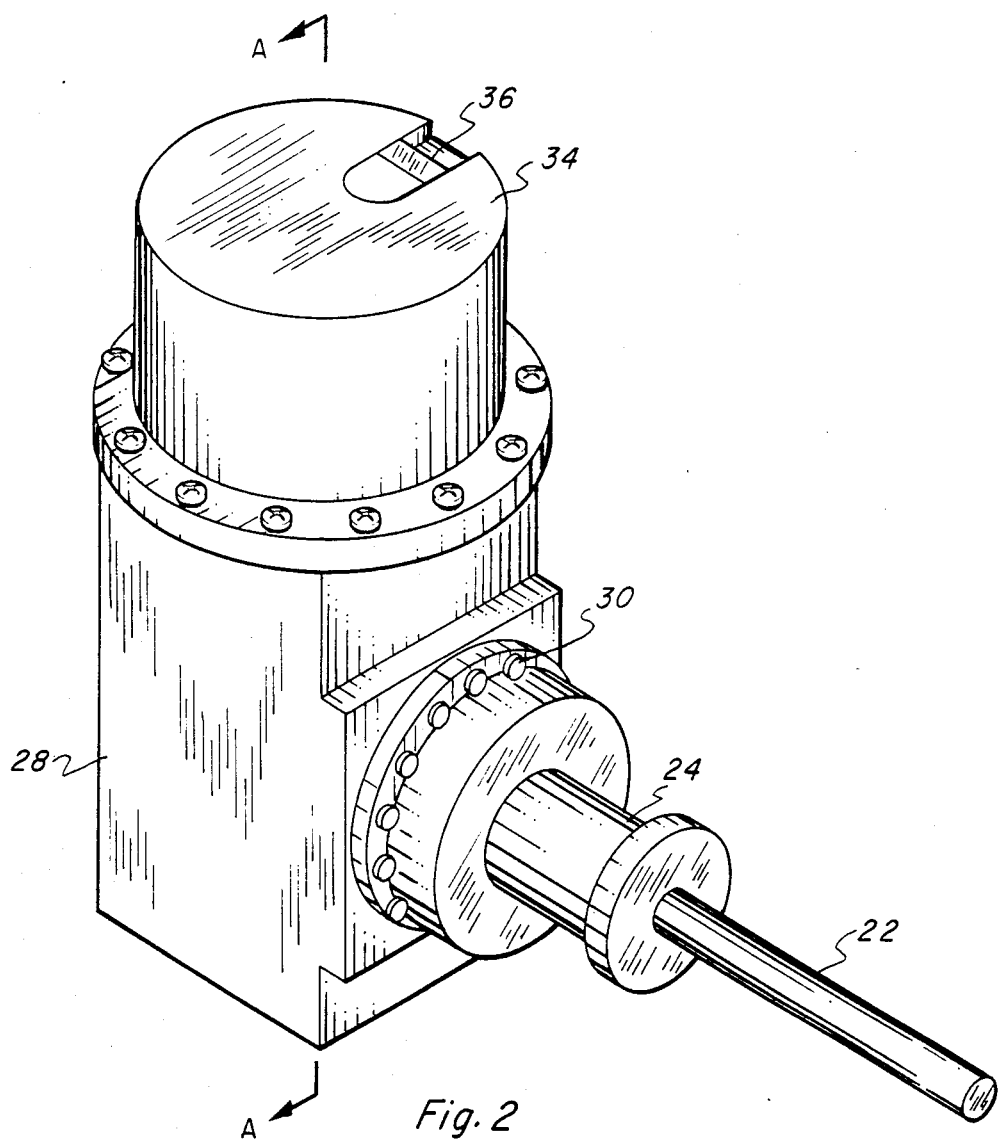
FIG. 2 is an isometric view of the refrigerator incorporated in the FLIR system of FIG. 1.
Figure 3:
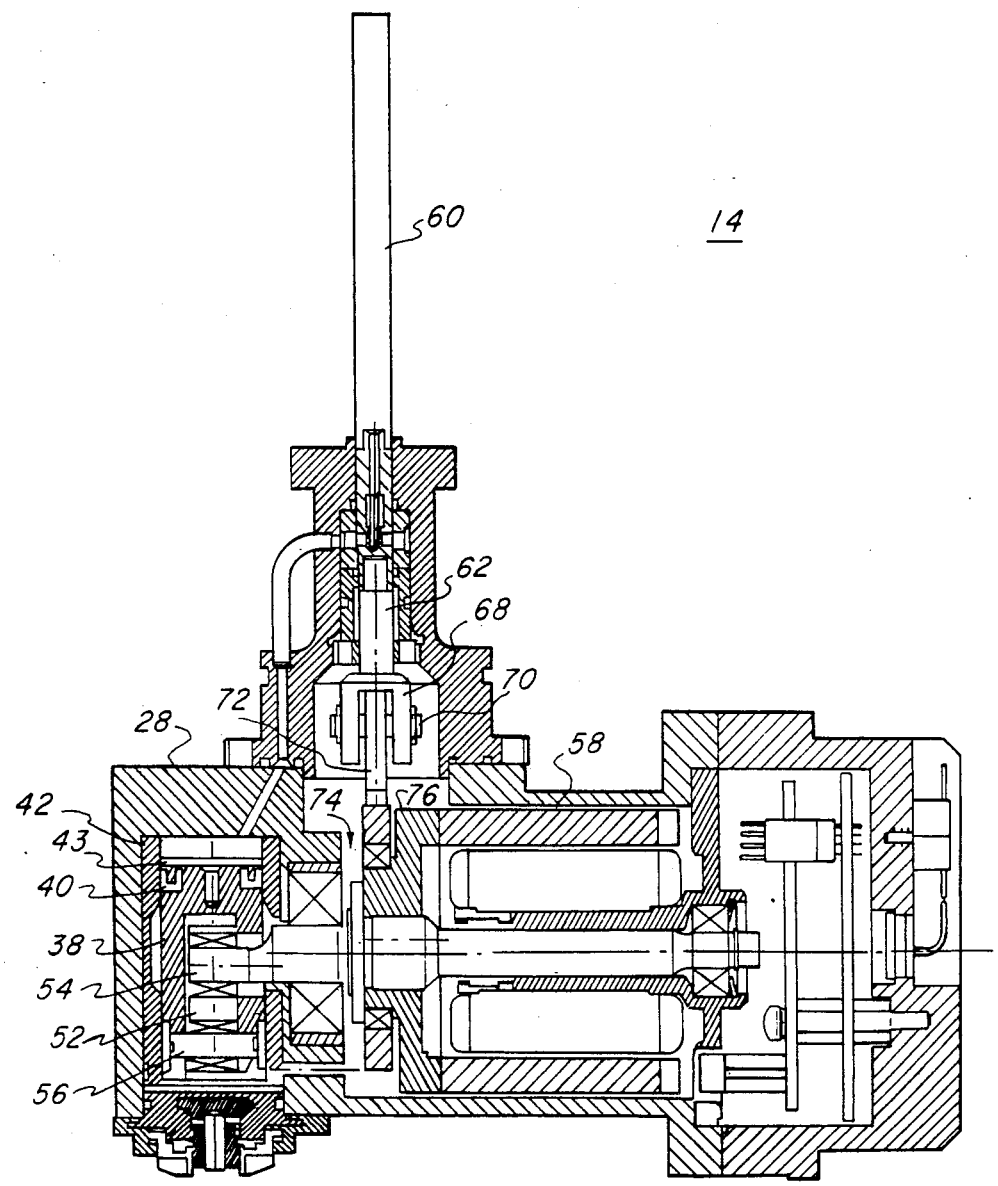
FIG. 3 is a cross-sectional view taken along line A—A of FIG. 2 showing the refrigerator without the spring-loaded piston.

Referring now to FIG. 2, the cold finger 22 has one end mounted in housing 24 to a piston housing 28 by bolts 30. An electronics housing 34 is attached to the housing 28 and is provided with electrical input leads 36 for connection to a source of power (not shown). The source of power provides electrical power to the electronics package and the motor rotor (not shown). Referring now to FIG. 3, the cryogenic refrigerator 14 housing 28 houses a first reciprocating member which is a cryogen compressor piston 38. A reciprocating seal 40 is positioned between the outer diameter of the piston 38, a seal retainer 43 and a sleeve 42. Sleeve 42 is rigidly connected to the housing 28.

A connecting rod 52 has one end attached to a crankshaft 54 and a second end connected to a wrist pin 56. The crankshaft 54 is driven by a motor 58. The connecting rod 52 reciprocates the piston 38 attached thereto.

The second reciprocating member is, in our example, a regenerator/displacer 60 is fixed to a first end of rod 62. The second end of rod 62 is a bifurcated end 68 which is connected by a wrist pin 70 to connecting rod 72. Rod 72 is driven by bearing 74 mounted on eccentric 76.

In operation the crankshaft 54 drives the connecting rod 52 which, moves the compressor piston 38 and the eccentric 76 which in turn reciprocates the rod 62 of the regenerator/displacer 60.

Figure 4:
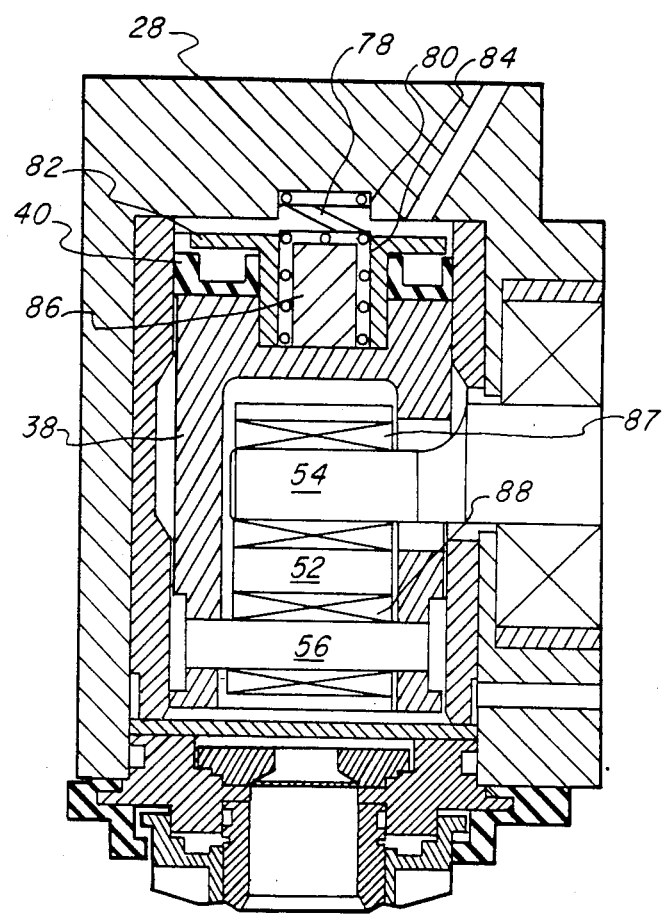
FIG. 4 is a partial cross-sectional view of the refrigerator of FIG. 3 showing the piston assembly modified to incorporate the spring-loaded feature of the invention.

Referring now to FIG. 4 the piston assembly includes a coil spring 78 fitted into walls 80 and 84 which form vertically alligned recesses in the housing 28 and piston 38, respectively. In this arrangement, the spring 78 is, for example, preloaded to about five pounds to provide the necessary piston driving force for providing the necessary preload at bottom dead center while minimizing the preload at top dead center.

A flanged annular type seal retainer 82 is threadedly mounted in the recess formed by the piston walls 84 to retain the piston seal 40. The spring 78 passes through the annulus of the seal retainer to abut the head of piston 38.

A plug 86 is mounted within the coil spring 78 to minimize the additional working volume created by the spring retaining recesses. A suitable material for the plug is, for example, hard rubber or a synthetic resin polymer plastic sold under the trademarks TEFLON and DELRIN.

The piston body 38 is mounted on the eccentric drive shaft 54 having one end of the connecting rod 52 mounted therein with roller bearing 87 therebetween. The other end of the connecting rod 52 is connected to wrist pin 56 with roller bearing 88 mounted therebetween.

The spring loaded piston eliminates the clearances between the roller bearings 87 and 88 and the eccentric shaft 54 and wrist pin 56 thereby reducing the noise level about 8 dB and eliminating the noise pulses. Further, because the energy absorbed by the spring in one portion of the cycle is returned to the cycle in another portion, the spring preload does not result in significant cooler performance degradation.

Although a single embodiment of the invention has been described, it will be apparent to a person skilled in the art that various modifications to details of construction shown and described may be made without departing from the scope of this invention.

What is claimed is:

1. A thermal energy device comprising:
   (a) a scanning means for scanning energy emanating from a scene;
   (b) a detector array for receiving the scanned energy and generating electrical signals representative of the energy emanating from the scene;
   (c) electro-optical means connected to the detector array for producing a visible representation of the energy emanating from the scene; and
   (d) a closed cycle cooler for cooling the detector array to its operating temperature, said cooler including a housing, a compressor piston and a regenerator/displacer piston, a piston connecting rod, a crankshaft, bearings mounted between the connecting rod and crankshaft, a motor operatively connected to the crankshaft for reciprocating the pistons, and a noise reducing means, the compressor piston including a head dividing the housing into a crankcase working volume and a working volume, walls of the compression piston head and housing forming coaxially aligned spring retaining recesses in the piston head and housing, the noise reducing means including a preloaded spring mounted in the coaxially aligned recesses for providing a driving force to the compression piston at bottom dead center while minimizing the driving force at top dead center for maintaining engagement of the connecting rod and crankshaft with the bearings whereby operating noise is substantially reduced.

2. A thermal energy device according to claim 1 wherein the compression piston further includes a piston seal, a flanged annular type seal retaining member, walls of the compression piston forming a recessed mount for the retaining member, said seal mounted in the piston adjacent the piston head for reciprocation therewith, the retaining member mounted in the recessed mount with the noise reducing spring passing through the annulus and the flanges contacting the seal for retaining the seal in sealing engagement between the piston and piston housing during reciprocation and with the noise reducing spring passing through the annulus.

3. A thermal energy device according to claim 1 wherein the noise reducing means further includes a plug mounted in the spring for reducing the additional working volume created by the piston head recess.

4. A closed cycle cooler for a thermal energy detection device comprising:
   (a) a housing;
   (b) a piston assembly mounted in the housing, the piston assembly including a compressor piston having a piston head, connecting rod, bearings, crankshaft and motor, the piston connected to the connecting rod, the connecting rod connected to the crankshaft with the bearings mounted therebetween, and the motor connected to the crankshaft for reciprocally moving the piston; and
   (c) a preloaded spring means operatively mounted between said piston head and housing for providing a driving force to the compressor piston at bottom dead center while minimizing the driving force at top dead center for maintaining engagement of the connecting rod and crankshaft with the bearings for reducing substantially the operating noise of the piston assembly.

* * * * *